United States Patent
Karmi et al.

(10) Patent No.: US 7,991,365 B2
(45) Date of Patent: Aug. 2, 2011

(54) METHOD, SYSTEM AND APPARATUS FOR ESTIMATION OF PROPAGATION PATH VARIABILITY OF A TRANSMIT DIVERSITY CHANNEL

(75) Inventors: Yair Karmi, Bridgewater, NJ (US); Eduardo Abreu, Allentown, PA (US)

(73) Assignee: Magnolia Broadband Inc., Warren, NJ (US)

( * ) Notice: Subject to any disclaimer, the term of this patent is extended or adjusted under 35 U.S.C. 154(b) by 687 days.

(21) Appl. No.: 11/712,569

(22) Filed: Mar. 1, 2007

(65) Prior Publication Data

US 2008/0214127 A1  Sep. 4, 2008

(51) Int. Cl.
*H04B 7/02* (2006.01)

(52) U.S. Cl. .......................... 455/101; 375/267

(58) Field of Classification Search ................ 455/67.11, 455/67.7, 69, 522, 562.1, 101, 102, 277.1; 375/267, 347

See application file for complete search history.

(56) References Cited

U.S. PATENT DOCUMENTS

| | | | |
|---|---|---|---|
| 5,396,645 A * | 3/1995 | Huff ............................. | 455/441 |
| 5,574,984 A * | 11/1996 | Reed et al. ..................... | 455/69 |
| 5,642,353 A | 6/1997 | Roy, III et al. | |
| 5,832,044 A | 11/1998 | Sousa et al. | |
| 5,991,330 A | 11/1999 | Dahlman et al. | |
| 5,999,826 A | 12/1999 | Whinnett | |
| 6,185,440 B1 | 2/2001 | Barratt et al. | |
| 6,226,509 B1 | 5/2001 | Mole et al. | |
| 6,236,363 B1 | 5/2001 | Robbins et al. | |
| 6,330,294 B1 | 12/2001 | Ansbro et al. | |
| 6,343,218 B1 | 1/2002 | Kaneda et al. | |
| 6,392,988 B1 | 5/2002 | Allpress et al. | |
| 6,492,942 B1 | 12/2002 | Kezys | |
| 6,636,495 B1 | 10/2003 | Tangemann | |
| 6,704,370 B1 | 3/2004 | Chheda et al. | |
| 6,745,009 B2 | 6/2004 | Raghothaman | |
| 6,810,264 B1 | 10/2004 | Park et al. | |
| 6,859,643 B1 | 2/2005 | Ma et al. | |
| 6,882,228 B2 | 4/2005 | Rofougaran | |
| 2003/0112880 A1 | 6/2003 | Walton et al. | |
| 2003/0148738 A1 * | 8/2003 | Das et al. ..................... | 455/101 |
| 2004/0048584 A1 | 3/2004 | Vaidyanathan et al. | |
| 2004/0085239 A1 | 5/2004 | Ukena et al. | |

(Continued)

FOREIGN PATENT DOCUMENTS

EP  0 986 193  3/2000

(Continued)

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

(Continued)

*Primary Examiner* — Thanh C Le

(74) *Attorney, Agent, or Firm* — Pearl Cohen Zedek Latzer, LLP

(57) ABSTRACT

A method and apparatus for dynamic adaptation of transmit diversity parameters according to detected dynamics that may be, for example, related to changes in actual propagation and network conditions, and may be referred to as mobility parameters. Mobility parameters may apply to variability in a propagation path due to any conditions. Determination of a mobility parameter may be conducted using one or more of multiple parameters available to the mobile terminal.

22 Claims, 4 Drawing Sheets

U.S. PATENT DOCUMENTS

| | | | |
|---|---|---|---|
| 2004/0203451 A1* | 10/2004 | Braun et al. | 455/67.11 |
| 2005/0059355 A1 | 3/2005 | Liu | |
| 2005/0143113 A1 | 6/2005 | Lee et al. | |

FOREIGN PATENT DOCUMENTS

| | | |
|---|---|---|
| EP | 1 282 242 | 2/2003 |
| EP | 1 282 244 | 2/2003 |
| EP | 1 284 545 | 2/2003 |
| EP | 1 262 031 | 5/2004 |
| GB | 2 353 437 | 2/2001 |
| JP | 09-238098 | 9/1997 |
| JP | 2000-151484 | 5/2000 |
| WO | WO 97/24818 | 7/1997 |
| WO | WO 00/79701 | 12/2000 |
| WO | WO 01/69814 | 9/2001 |
| WO | WO 03/090386 | 10/2003 |
| WO | WO 2004/045108 | 5/2004 |
| WO | WO 2005/081444 | 9/2005 |

OTHER PUBLICATIONS

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

* cited by examiner

| MOBILITY VALUE | PATH CONDITION | TRACKING STEP | STEP VALUE |
|---|---|---|---|
| 0-10 | STATIC | MINIMAL | 1 |
| 11-15 | LOW MOBILITY | LOW | 2 |
| 16-25 | MEDIUM MOBILITY | MEDIUM | 3 |
| 26-50 | HIGH MOBILITY | HIGH | 5 |
| >51 | VERY HIGH MOBILITY | VERY HIGH | 8 |

METHOD, SYSTEM AND APPARATUS FOR ESTIMATION OF PROPAGATION PATH VARIABILITY OF A TRANSMIT DIVERSITY CHANNEL

FIELD OF THE INVENTION

The present invention relates to wireless transmit diversity, and in particular to methods, systems and apparatus for control of transmit diversity in wireless systems.

BACKGROUND OF THE INVENTION

Wireless transmission systems may use transmit diversity, whereby signals are transmitted to a receiver using a plurality of transmit antennas. Typically, such transmit diversity systems are intended to increase network capacity and reduce the signal degradation caused by multi-path and fading. Transmit diversity parameters may be applied to signals transmitted from two or more antennas, and may modify an effective power distribution detected by receivers, such as base stations. A signal quality received may change at a receiver that may be attempting to detect a transmission from a mobile terminal, as well as a noise level created by a wireless terminal transmission in base stations attempting to detect signals from other wireless terminals. A signal to noise ratio perceived by a base stations may change with varying parameters of transmit diversity control.

SUMMARY OF EMBODIMENTS OF THE INVENTION

Transmit diversity performance may be measured with respect to certain parameters, such as transmit power, throughput, system capacity and coverage. Transmit diversity control algorithms have parameters that may provide different performance under different operational conditions. When propagation conditions are stable or vary slowly, small changes of parameters around values previously defined may provide good performance and more stable operation and maximize benefits of transmit diversity control. In a dynamic environment, such as when a mobile terminal may be moving or other objects cause variations of the propagation path between a transmitter and a receiver, transmit diversity control may achieve improved performance by, for example, allowing a larger change in algorithm parameters. A parameter may be, for example, a step size in a phase difference between transmitted signals or may be a smaller interval between changes in parameters. A faster rate of change of a parameter may allow faster adaptation of a transmit diversity control parameter to a varying propagation condition.

Embodiments of the present invention include a method and apparatus for dynamic adaptation of transmit diversity parameters according to detected dynamics that may be, for example, related to changes in actual propagation and network conditions, and may be referred to as mobility parameters. Mobility parameters may apply to variability in a propagation path due to any conditions. Determination of a mobility parameter may be conducted using one or more of multiple parameters available to the mobile terminal.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
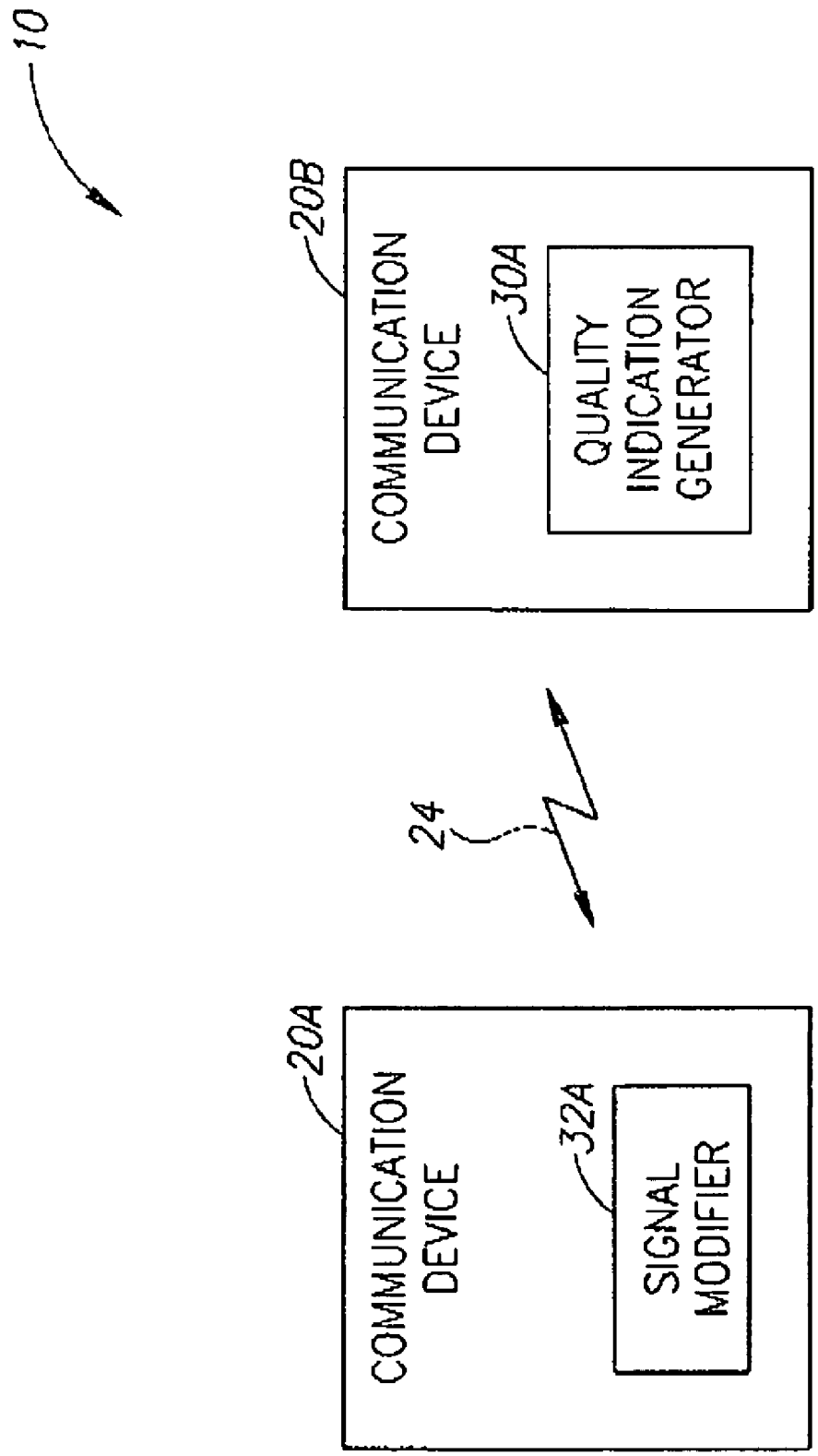
FIG. 1 is a schematic block diagram of a communication network according to an embodiment of the present invention that includes one or more transmitting communication devices and one or more receiving communication devices that communicate via a wireless link.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF ILLUSTRATED EMBODIMENTS OF THE PRESENT INVENTION

Embodiments of the present invention may allow for transmit diversity control by using a system that uses selection of phase parameters to enhance the system throughput, by requiring less repetitions or supporting higher data rate and larger, more efficient data packets. Embodiments of the present invention may allow for a system with reduced power consumption by providing control of the power ratio, or relative amplitude, the relative phase, or both, of output signals. Embodiments of the present invention may allow for improvement of power efficiency, optimized received signal quality, or both, by maintaining high radio frequency (RF) linearity through an air interface with a defined power range. Embodiments of the present invention may allow for improvement of the effects of switching transients by providing improved phase shift schemes. Embodiments of the present invention may allow for improvement of routing by providing improved switch configurations.

Embodiments of the invention may provide for improved performance, measured, for example, in terms of the power the unit is required to transmit for the receiver to receive acceptable signal quality, the number of errors in the transmission, higher throughput and improved coverage resulting from possibly improved selection of diversity control parameters.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the present invention and its advantages are best understood by reference to FIGS. 1 through 5, like numerals being used for like and corresponding parts of the various drawings; however, it will be understood that the figures depict examples and embodiments only and do not limit the scope of the present invention.

FIG. 1 is a block diagram illustrating a communication network 10 according to an embodiment of the present invention that includes a modifying communication device 20a that that adjusts a nominal value of a transmit diversity parameter. According to the embodiment, modifying communication device 20a may compute a diversity parameter that is used to control the power, phase, or both, of transmit diversity for a signal transmitted from communication device 20a to receiving communication device 20b. Modifying communication device 20a may adjust a nominal value of transmit diversity parameter based on the adjustment of the phase, power, or both parameters.

According to the illustrated embodiment, network 10 may operate to provide services such as communication sessions. A communication session may refer to an active communication between endpoints, measured from endpoint to endpoint. Information is communicated during a communication session. Information may refer to voice, data, text, audio, video, multimedia, control, signaling, other information, or any combination of the preceding.

The information may be communicated in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets. A packet may comprise any suitable packet, such as a General Packet Radio Service (GPRS) packet, an Enhanced Data for GSM Evolutions (EDGE) packet, or other suitable packet.

Network 10 may utilize communication protocols and technologies to provide the communication sessions. Examples of communication protocols and technologies include those set by the Institute of Electrical and Electronics Engineers, Inc. (IEEE) 802.xx standards, International Telecommunications Union (ITU-T) standards, European Telecommunications Standards Institute (ETSI) standards, Internet Engineering Task Force IETF) standards, or other standards.

Devices of network 10 may use any suitable multiple access technology, for example, a code division multiple access (CDMA) technology. According to one embodiment, network 10 may operate according to a CDMA 2000 telecommunications technology that uses a single CDMA channel. As an example, a CDMA 2000 high rate data packet technology, such as the Evolution Data Only (EvDO) technology may be used.

Network 10 may comprise any suitable communication network. A communication network may comprise all or a portion of a public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding.

A component of network 10 may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

Communication network 10 may include one or more modifying communication devices 20a and one or more communication devices 20b that communicate via a wireless link 24. Either or both of communication devices 20a or 20b may be any device operable to communicate information via signals with one or more other communication devices. For example, communication device 20a or 20b may comprise a subscriber unit or a base station. A subscriber unit may comprise any device operable to communicate with a base station, for example, a personal digital assistant, a cellular telephone, a mobile handset, a computer, or any other device suitable for communicating signals to and from a base station. A subscriber unit may support, for example, Session Initiation Protocol (SIP), Internet Protocol (IP), or any other suitable communication protocol.

A base station provides a subscriber unit access to a communication network that allows the subscriber unit to communicate with other networks or devices. A base station typically includes a base transceiver station and a base station controller. The base transceiver station communicates signals to and from one or more subscriber units. The base station controller manages the operation of the base transceiver station.

Either or both of communication devices 20a or 20b may include one or more antenna elements, where each antenna element is operable to receive, transmit, or both receive and transmit a signal. Multiple antenna elements may provide for a separation process known as spatial filtering, which may enhance spectral efficiency, allowing for more users to be served simultaneously over a given frequency band.

A communication link between communication devices 20a and 20b such as wireless link 24 may be a radio frequency link that is cellular in network organization. Wireless link 24 may be used to communicate a signal between communication devices 20a and 20b.

As described more fully below, according to embodiments of the present invention, modifying communication device 20a may include a signal modifier 32a that modifies one or more signals. Signal modifier 32a may then modify the transmit signal in accordance with selection of phase, power, or both, diversity parameters.

According to one embodiment of the invention, modifying a signal may refer to modifying a signal feature. A transmission signal feature, or in some embodiments of the invention, a transmit diversity parameter, may refer without limitation to any feature of the transmission, for example, relative phase, relative amplitude, relative power, absolute power, frequency, timing, other suitable signal feature that may be modulated, or any combination of the preceding. Relative phase may refer to the phase difference between the phase of a first signal of a first transmit antenna element and the phase of a second signal of a second transmit antenna element. Relative power may refer to the ratio between the power of a first signal of a first transmit antenna element and the power of a second signal of a second transmit antenna element, which ratio may be defined on a linear or logarithmic scale. Relative amplitude may refer to the ratio between the amplitude of a first signal of a first transmit antenna element and the amplitude of a second signal of a second transmit antenna element. Absolute power may refer to the total power transmitted by all antennas of modifying communication device 20*a*. According to one embodiment, modifying a signal may be described as adjusting a nominal value of a transmit diversity parameter. As described more fully herein, according to an embodiment of the invention, adjustment of a transmit diversity parameter may comprise selecting phase diversity parameters, selecting power diversity parameters, or both.

A modifying communication device 20*a* calculates transmit diversity parameters for use in transmitting across wireless link 24. Modifying communications device 20*a* may modify transmit diversity parameters for transmission to receiving communication device 20*b* using phase diversity parameters, power diversity parameters, or both.

In some embodiments of the device, modifying communication device 20*a* may include a transmit signal control and a signal modifier. Quality indication generator 30*a* may generate parameters used for controlling transmit diversity of modifying communication device 20*a*. The parameters may be generated by any suitable manner, for example, based on feedback from the receiving communication device 20*b*, actual environmental conditions at the modifying communication device 20*a*, one or more performance parameters measured at modifying communication device 20*a*, or other indications. Signal modifier 32*a* may modify a pre-transmission signal in accordance with one or more transmit diversity parameters obtained from quality indication generator 30*a*.

Alterations or permutations such as modifications, additions, or omissions may be made to communication network 10 without departing from the scope of the invention. Additionally, operations of communication network 10 may be performed using any suitable logic comprising software, hardware, other logic, or any suitable combination of the preceding.

In one embodiment of the present invention, mobility parameters may be based on power control signals. These signals may be power control commands that may be transmitted by a base station and may be received by a terminal. The signal may include a command to increase or reduce transmitted power of a mobile station. During some transmission conditions that may allow for stable propagation conditions, a variation in pilot channel power that the mobile terminal may be required to control may be small. In other conditions, for example when propagation conditions may become less stable, a transmission condition, for example, a path loss between a base station and a mobile terminal may become highly variable. In this case, the uplink power control may reflect this variation by requesting a larger change in a mobile transmit power.

In an embodiment of the present invention, mobility parameters may be based on a detection of a received power level mobility on the downlink. A mobile terminal may detect transmission of one or multiple base stations; When the propagation conditions are stable, a detected power level may be relatively stable. When the dynamics of the propagation increase, a rate of change of a received power level may increase.

An embodiment of the present invention may base mobility detection on actual feedback from a base station, and may indicate a change in conditions. A base station may measure a signal level from a mobile terminal, and may determine, from multiple measurements over time, a variability of an uplink propagation path. A base station may send to a mobile terminal, either as part of a standard, if allowed, or as a higher level message, an indication of variability level of a propagation path.

Additional embodiments of the present invention may include any combination of any of these embodiments, and/or that may allow for the determination of additional mobility parameters.

Figure 2:
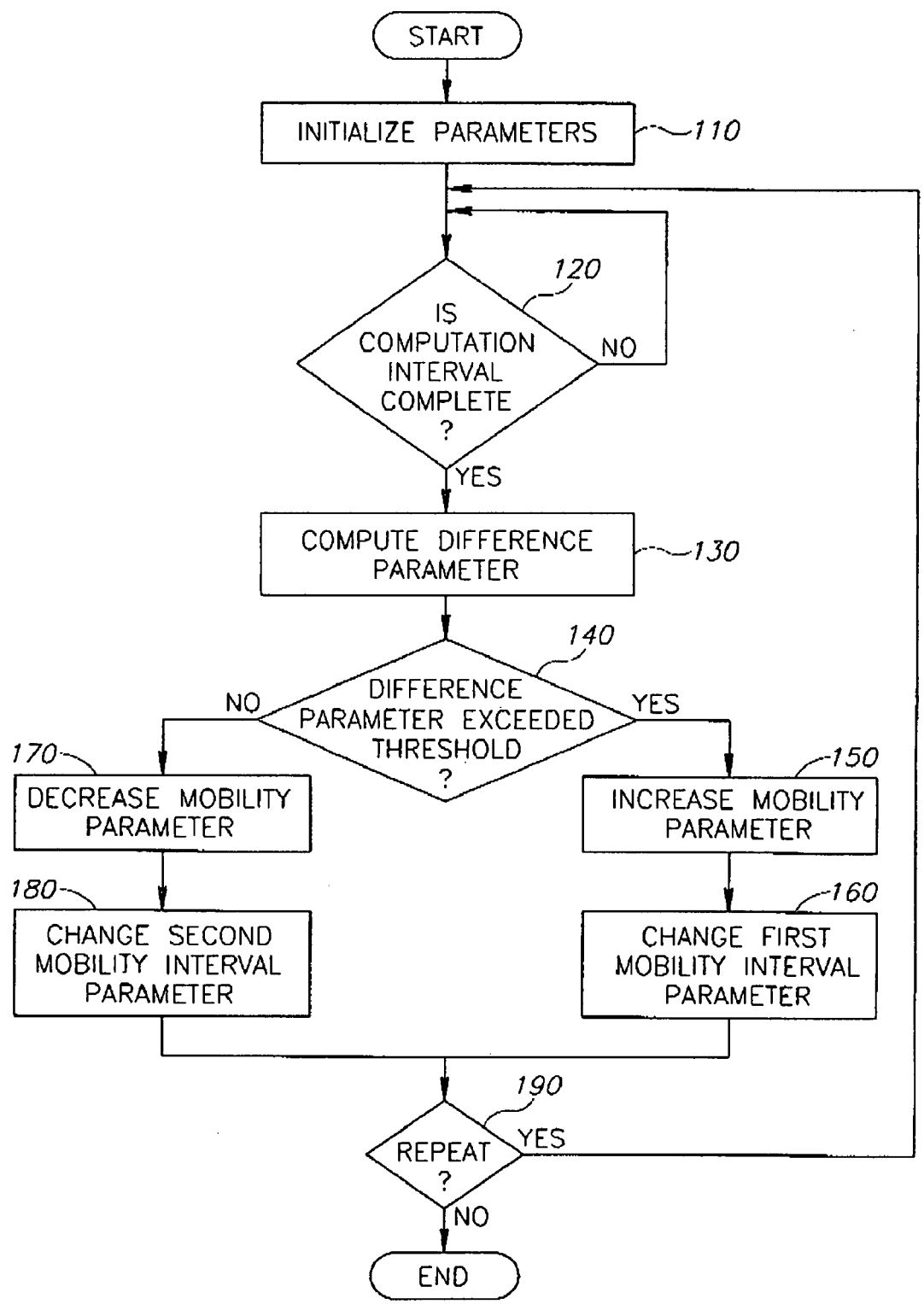
FIG. 2 is a flowchart illustrating a method for computing mobility parameters using a threshold according to an embodiment of the present invention.

FIG. 2 is a flowchart illustrating a method for computing mobility parameters using a threshold according to an embodiment of the present invention. This method applies a difference in power to detect changes in dynamics of propagation. The method may be executed at intervals, which may be every time a new input is received, or at larger intervals that may correlate to a lower rate, as it may not be necessary to compute dynamics of a propagation path at a maximum rate. The method may determine variation of power within a window, which may include multiple slots, and may be measured in time units that may correspond to an air interface. A variation may include, refer to, or correspond to a difference between a maximum and a minimum power within a window, which may require more sampling and processing, or a difference between a power at the end of a window and the power at its beginning. A slot in W-CDMA is approximately 667 μsec, in cdma2000 1× it is 1.25 msec, in EvDO it is approximately 1.67 msec. A window may for example be equivalent to the duration of 16 slots. Different power differences may apply to various embodiments of the present invention.

In one embodiment of the invention, a power difference may be an addition of reverse power control-bits (PCB) in a window, or a difference between a maximum and a minimum pilot power transmitted during a window, or an actual pilot power during a last slot of a window, less actual pilot power during a first slot of the window.

In an embodiment of the invention, a power difference may be a difference between a maximum and a minimum pilot power in signals received from a base station, that may be received with highest power, or may be between a maximum and a minimum total pilot power, where in both cases a pilot power may be computed multiple times within a window, for example, in every slot.

In an embodiment of the invention, a power difference may be between a maximum and a minimum pilot power in a mobile terminal uplink signal that may be received by a base station during a window, or a difference between a pilot power received during a previous slot of a window and a pilot power during a first slot of the window.

A mobility parameter that may be used may be a measure of signal quality, for example, a standard deviation of a signal quality of a received parameter across a window. This parameter may be used, for example, in lieu or in addition to a power difference. Other power differences or other similar parameters may be selected within the scope of this invention.

In an embodiment, a number N of slots may represent a window size. An interval between computations may be designated as INTERVAL1 or INTERVAL2, and may comprise similar or different values. An algorithm threshold that may be used to determine variability within a window may be designated THRESH1. A maximum allowable value for a mobility parameter may be designated MAX_MOBILITY, and a minimum allowable value for a mobility parameter may be designated MIN_MOBILITY.

Referring to FIG. 2, the mobility parameters may be set to initial values in step 110. When an interval includes a certain number of slots, a SLOT variable may be defined, and may be increased, modulo the number of slots INTERVAL in a selected interval. For example, SLOT=0 may set a parameter to the beginning of a window, and MOBILITY=0 may set an initial mobility parameter. In step 120 it is determined whether it is time to compute a new MOBILITY value, in accordance with the present value of the computation interval. The present interval may be set to a constant value or may be variably set to different values. The SLOT variable may be increased, for example, by the formula SLOT=(SLOT+1) mod INTERVAL. If an interval condition is met, and a computation interval is complete, for example when SLOT=0, the algorithm continues to step 130. If the condition is not met, for example when SLOT>0, the algorithm may not perform any computation, and may return to the input of step 120, where it will next test for completion of an interval, for example during the next slot.

In step 130, the selected power difference may be computed inside a window. If a power difference is an uplink pilot power change across a window, it may be computed by adding the N most recent PCB's, and each PCB may be assigned a corresponding power change value. In W-CDMA (UMTS) PCB=0 may be assigned a value of +1 and PCB=1 may be assigned a value of −1, and in cdma2000 PCB=0 may be assigned a value of −1 and PCB=1 may be assigned a value of +1.

In step 140, a power difference may be compared with a threshold. In the illustrated embodiment, a threshold may be assumed to be symmetrical, and an absolute value of a power difference may be used to determine if a single threshold THRESH1 is exceeded. For example, when there are more +1 inputs than −1 inputs, the accumulation may exceed +THRESH1 and when there are more −1 inputs than +1 inputs, the accumulation may yield a more negative result than −THRESH1. If an absolute power difference exceeds a threshold, the algorithm continues to step 150. If an absolute power difference does not exceed the threshold, the algorithm continues to step 170.

In step 150 a mobility parameter MOBILITY may be increased, up to a maximum MAX_MOBILITY, for example, MOBILITY=min{MOBILITY+STEP1, MAX_MOBILITY}. The determination of a new MOBILITY parameter may be completed. The method may proceed to step 160, where a first mobility interval parameter may be changed. In one embodiment, the parameter may be set to INTERVAL1, which may correspond to an increase in a MOBILITY parameter. The method may then return to step 120 to await the next computation.

In step 170 a mobility parameter MOBILITY may be decreased. In an embodiment, the parameter may be reduced by a decay factor DECAY, for example, MOBILITY=MOBILITY×DECAY. In another embodiment, the parameter may be reduced linearly down to a limit, for example, MOBILITY=min{MOBILITY−STEP2, MIN_MOBILITY}. A determination of a new MOBILITY parameter may be completed. The algorithm may proceed to step 180, where a second interval may be changed. In one embodiment, the parameter may be set to INTERVAL2, which may correspond to a reduction in a MOBILITY parameter. The method may then return to step 120 to await the next computation.

Upon calculating the mobility interval parameter, at least one transmit diversity parameter may be modified based thereupon, for example, step size, offset, perturbation rate, etc. In one embodiment, when mobility increases, the method may increase at least one of step size, offset, or perturbation rate, and when mobility decreases, the method may decrease at least one of step size, offset, or perturbation rate.

In one embodiment, values of the mobility interval parameters may be, for example, a computation interval after increasing MOBILITY parameter, INTERVAL1=8, a computation interval after decreasing MOBILITY parameter, INTERVAL2=4, window size, or number of inputs for which a single computation may be made N=16, power threshold for 1 dB PCB's THRESH1=12, mobility parameter step size STEP1=0.47, and decay factor DECAY=0.999. It will be understood that the values provided are particular examples, and that other values and parameters may be used within the scope of the invention.

Figure 3:
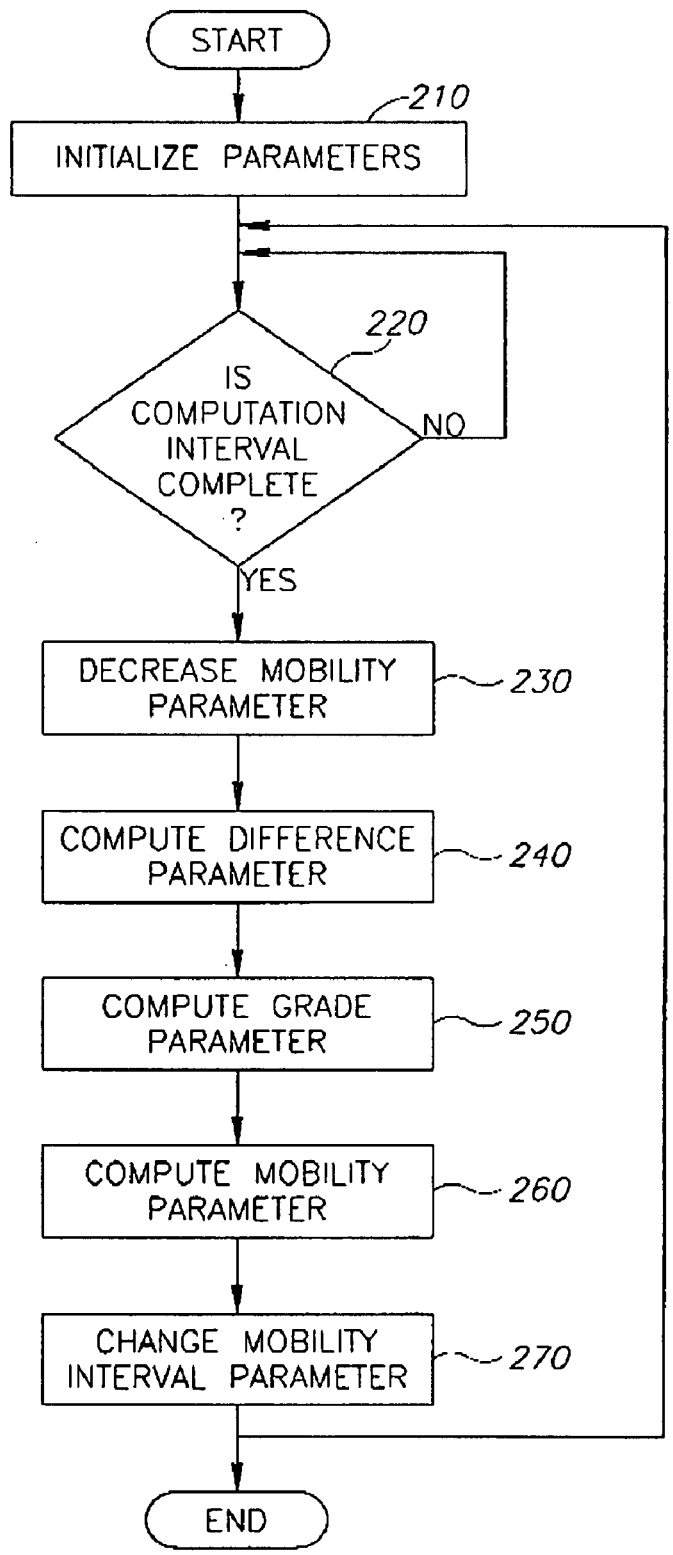
FIG. 3 is a flowchart illustrating a method for computing mobility parameters using values according to an embodiment of the present invention.

FIG. 3 is a flowchart illustrating a method for computing a mobility parameter according to a soft in window mobility detection algorithm. This soft algorithm may allow assignment of multiple values, for example, grades, to this power difference. This method may increase flexibility, relative to the threshold method. The grade may represent a power difference within a range of possible values. A grade may be associated with a specific power difference or with a range of power differences. A grade may be added to a MOBILITY parameter, or parameters where multiple MOBILITY parameters may be computed.

In step 210, mobility parameters may be initialized. In step 220, it may be determined whether it is time to compute a new MOBILITY value, according to the present interval. In step 230 a previous MOBILITY value may first be decreased, for example, to account for the additional aging, before conditionally increasing it based on a specific power difference. A power difference may be computed in step 240. In step 250, a GRADE may be looked up per the value of the power difference from a memory. In step 260 a GRADE may be added to a MOBILITY parameter, and a mobility parameter is computed. If GRADE=0, for example, MOBILITY may not be increased. GRADE may be negative, and may, for example, lead to a decrease in MOBILITY, up to a minimum value. In step 270, an interval parameter that may determine a next computation may be set. An interval may be constant, for example, and this step may be skipped. The parameter may be a function of a difference in power, or may be a function of a MOBILITY parameter. The algorithm then returns to step 120 for the next computation.

Figures 4, 5:
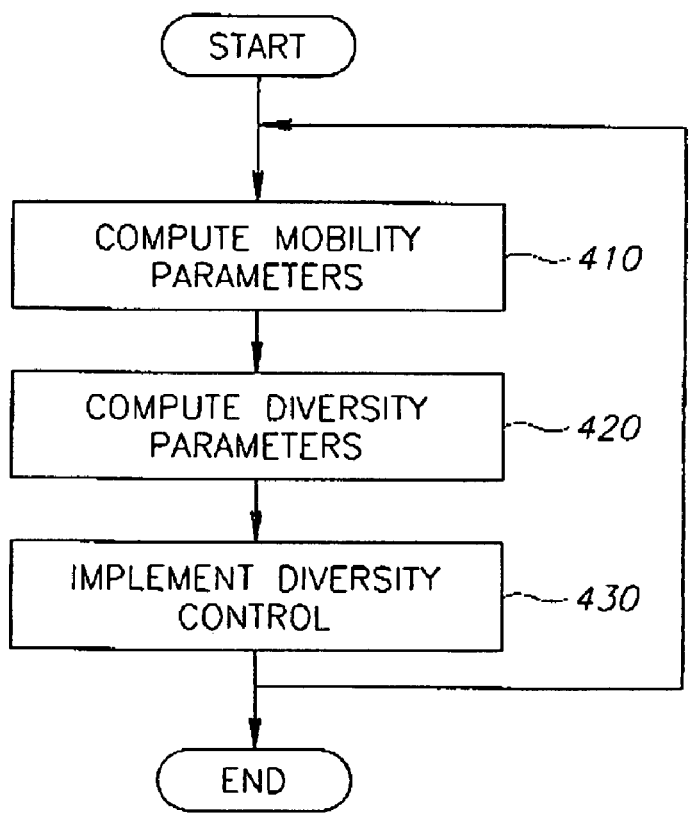
FIG. 4 is a table of mobility values according to an embodiment of the present invention.
FIG. 5 is a flowchart illustrating a method for computing diversity parameters according to an embodiment of the present invention.

An interpretation may be made to apply the mobility conditions to a transmit diversity control algorithm, for the value of a MOBILITY parameter and specific algorithm parameters may be selected. FIG. 4 is a table of an example of an embodiment of an interpretation. In this embodiment, multiple ranges of a mobility value MOBILITY may be selected. The mobility values 310 are shown as an example of a possible selection. A propagation path condition 320 may be associated with these value ranges. For example, a propagation path condition 320 may range from static, or most stable, to very high mobility, or fastest changing. A tracking step 330 of a transmit diversity parameter, for example a step controlling how fast diversity parameters may change, may be assigned step values 340. For example, a minimal step value 340 may be 1, a low value may be 2, a medium value may be 3, a high value may be 5 and a very high value may be 8.

FIG. 5 is a flowchart of a mobility application to an operation of a transmit diversity algorithm, that may allow for changes in propagation conditions. In step 410, the mobility parameters are computes according to an embodiment of the present invention. In step 420, a transmit diversity algorithm is executed using modified parameters from the mobility computation. In step 430 transmit diversity control parameters are implemented, as they may have been modified by the detected propagation conditions, and are output and applied to the signal modifier transmit signals.

Another embodiment of the present invention may be Mobility computations based on a combination of embodiments. A first method of combination, for example, may be to apply the threshold method illustrated by FIG. 2 to each input parameter separately, for example, each embodiment computes its own mobility factor. Then, the mobility factors generated by the different active embodiments may be combined to form a single MOBILITY factor.

A second method of combination may be to use a modified algorithm that may combine multiple input parameters previously used by separate embodiments into a single combined computation.

Both combination methods may be used alone, or in combination with each other. For example, the second combination method may be applied to generate a common mobility parameter based on two embodiments, and a third embodiment may yield a separate mobility parameter. This may be applicable when inputs to different embodiments may be physically separated, for example, when some inputs may be mobile terminal measurements and other inputs may be base station measurements. A mobility parameter computed by one embodiment may then be transmitted to a unit that may combine separate parameters.

Another combination embodiment may be where each embodiment may compute a mobility parameter independently using the algorithm illustrated by FIG. 2. Then a first embodiment may output MOBILITY1, a second embodiment may output MOBILITY2, and additional embodiments may have additional outputs, and for each parameter there may be separate mobility results. A single combined MOBILITY parameter may be determined by modifying transmit diversity parameters, directly, or by weighting. For example, a linear weighting algorithm may be represented by:

MOBILITY=$k1 \times$MOBELITY1+$k2 \times$MOBILITY2+ $k3 \times$MOBELITY3

In one example of an embodiment of equal weighting, the weights may be k1=k2=k3=⅓. Or, for example, when only using two parameters where the first is considered twice as reliable as the second, a weighting may be k1=⅔, k2=⅓, k3=0.

In an example of an embodiment, k1+k2+k3=1, and the same scale for all mobility values may be preserved. In an example of another embodiment, k1=3, k2=4, and k3=1 may also be selected. In an example of another embodiment, different weightings may be used to bring the different mobility parameters to a common scale.

An example of an implementation may be by modifying step 230 of FIG. 2. In this modified implementation, the mobility parameter may be computed based on multiple types of inputs. An example may be to combine a first embodiment and a second embodiment, where a first embodiment may use a mobile transmitted pilot power and, for example, may compute a difference in a power in a window, ΔPower1. A second embodiment may use a received downlink pilot power, and may compute a difference in a power in a window, ΔPower2. In this example, the modified step 230 may include:

ΔPower1($n$)=Power1($n$)−Power1($n-N$+1)

ΔPower2($n$)=Power2($n$)−Power2($n-N$+2)

ΔPower=$k5 \times$|ΔPower1($n$)|+$k6 \times$|ΔPower2($n$)| where n may be a present time, N may be a window duration, and n and/or N may use units of slots, k5 and k6 are weighting factors. In one example k5=k6=0.5.

Another method of combining results from separate embodiments into a combined embodiment may be by Boolean combination. For example, a Boolean parameter LogicMOB which is TRUE when MOBILITY is higher than some threshold and FALSE otherwise may be defined. There may be multiple parameters MOBILITYj, (j=1,2,3, . . . ) and the same may apply for all of them, with respective Boolean parameters LogicMobj associated therewith. Multiple Boolean functions may be defined. For example, one such combination may be a logical OR, which may apply to a TRUE /FALSE value of MOBILITY parameters:

LogicMOB=LogicMOB1 OR LogicMOB2 OR LogicMOB3

LogicMOB may be true if any of the measured separate parameters indicate variability of a propagation path.

In another example, a different logical operator AND may be used:

LogicMOB=LogicMOB1 AND LogicMOB2 AND LogicMOB3 which may render LogicMOB TRUE when all separate parameters may be TRUE. It will be recognized that any combination of logical operators may be used in conjunction with the present invention.

In another example of combining embodiments that may be applicable to numerical values of the MOBILITY parameter, it may be defined to be a maximum of separate parameters:

MOBILTY=max{MOBILITY1, MOBILITY2, MOBILITY3}

A minimum of separate parameters may also be used in a similar fashion.

In another embodiment, more than one MOBILITY parameter using different parameters such as STEP1, STEP2 and DECAY or different combinations of separate parameters may be computed, and these different MOBILITY parameters may be applied to control different parameters of a diversity control algorithm. In this example, some algorithm steps may be made to respond faster to, for example, quick changes in propagation conditions, and another parameter, for example a computation interval, may be made to respond slower.

Embodiments of the invention may apply to any transmit diversity control method. It will be understood that the methods discussed herein may be integrated with any transmit diversity control algorithm. It will further be understood that the present invention may be implemented as a stand-alone processing module, or may be integrated into a transmit diversity control processor, algorithm, or signal path circuitry.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A transmit diversity communication method comprising:
    calculating at a mobile device at least one mobility parameter, said mobility parameter indicating alteration in propagation of a signal transmitted between said mobile device and a second device wherein calculating said at least one mobility parameter comprises calculating at least one power difference and incrementing a previous value of said mobility parameter if said power difference is greater than a threshold;
    calculating based on said at least one mobility parameter at least one diversity parameter; and
    transmitting a transmit diversity signal from said mobile device using said at least one diversity parameter.

2. The transmit diversity method of claim 1, wherein said at least one power difference is selected from the group consisting of: a difference between a minimum power and a maximum power within a time window, a difference between a first power and a last power within a time window.

3. The transmit diversity method of claim 1, wherein calculating said mobility parameter comprises decrementing a previous value of said mobility parameter if said power difference is less than said threshold.

4. The transmit diversity method of claim 1, further comprising repeatedly at time intervals calculating said at least one mobility parameter and calculating said at least one diversity parameter.

5. The transmit diversity method of claim 4, wherein said time intervals are based on said power difference.

6. The transmit diversity method of claim 5, wherein said time intervals are selected from at least two constant time intervals based on said comparison of said power difference to said threshold.

7. The transmit diversity method of claim 1, wherein calculating said at least one diversity parameter based on said at least one mobility parameter comprises increasing a diversity interval parameter in a first direction based on an increase in said mobility parameter.

8. The transmit diversity method of claim 7, wherein calculating said at least one diversity parameter based on said at least one mobility parameter comprises increasing said diversity interval parameter in said first direction if said mobility parameter exceeds a threshold value.

9. The transmit diversity method of claim 7, wherein calculating said at least one diversity parameter based on said at least one mobility parameter comprises decreasing said diversity interval parameter in a second direction opposite said first direction based on a decrease in said mobility parameter.

10. The transmit diversity method of claim 9, wherein calculating said at least one diversity parameter based on said at least one mobility parameter comprises decreasing said diversity interval parameter in said second direction if said mobility parameter does not exceed a threshold value.

11. The transmit diversity method of claim 1, wherein said at least one power difference is calculated based on at least one power control signal received by said mobile device from said second device.

12. A transmit diversity communication system comprising:
a first communication device having
a processor to:
calculate at said mobile communication device at least one mobility parameter, said mobility parameter indicating alteration in propagation of a signal transmitted between said mobile communication device and a second communication device,
calculate based on said at least one mobility parameter at least one diversity parameter, and
calculate at least one power difference and increment a previous value of said mobility parameter if said power difference is greater than a threshold,
a first transmitter to transmit a diversity signal from said mobile communication device using said at least one diversity parameter; and
a second communication device having
a processor to calculate a quality indication parameter relating to a signal received from said mobile device, and
a second transmitter to transmit said quality indication signal to said first transmitter.

13. The communication system of claim 12, wherein said at least one power difference is selected from the group consisting of: a difference between a minimum power and a maximum power within a time window, a difference between a first power and a last power within a time window.

14. The communication system of claim 12, wherein said processor of said mobile communication device is to decrement a previous value of said mobility parameter if said power difference is less than said threshold.

15. The communication system of claim 12, further comprising repeatedly at time intervals calculating said at least one mobility parameter and calculating said at least one diversity parameter.

16. The communication system of claim 15, wherein said time intervals are based on said power difference.

17. The communication system of claim 15, wherein said time intervals are selected from at least two constant time intervals based on said comparison of said power difference to said threshold.

18. The communication system of claim 12, wherein said processor of said first device is to increase a diversity interval parameter in a mobile communication direction based on an increase in said mobility parameter.

19. The communication system of claim 18, wherein said processor of said mobile communication device is to increase said diversity interval parameter in said first direction if said mobility parameter exceeds a threshold value.

20. The communication system of claim 18, wherein said processor of said mobile communication device is to decrease said diversity interval parameter in a second direction opposite said first direction based on a decrease in said mobility parameter.

21. The communication system of claim 20, wherein said processor of said mobile communication device is to decrease said diversity interval parameter in said second direction if said mobility parameter does not exceed a threshold value.

22. The communication system of claim 12, wherein said processor of said mobile device is to calculate at least one power difference based on at least one power control signal received by said mobile communication device from said second communication device.

* * * * *